April 16, 1963 R. S. HOWE, JR., ETAL 3,085,810
RETAINING RING FOR A BEARING SEAL
Filed Aug. 30, 1960
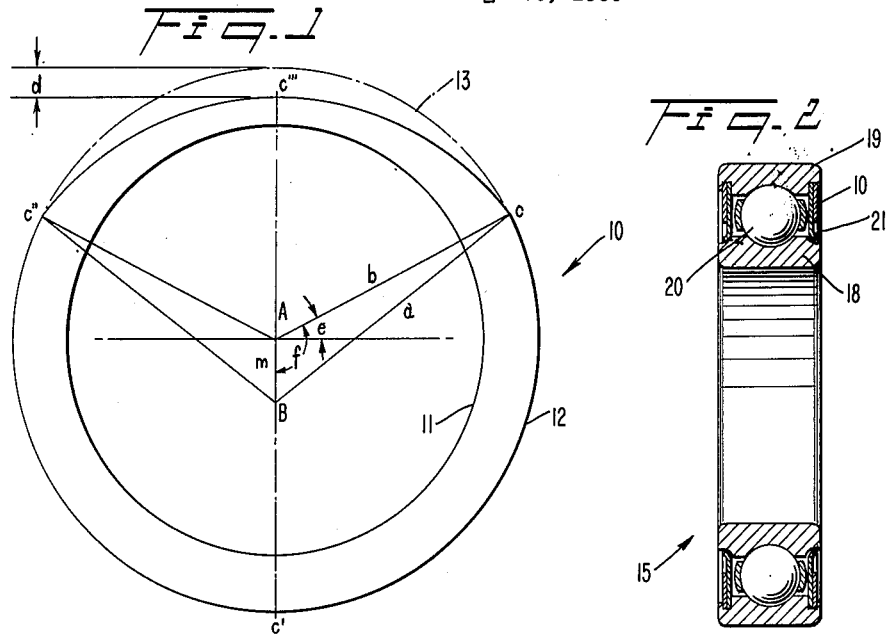
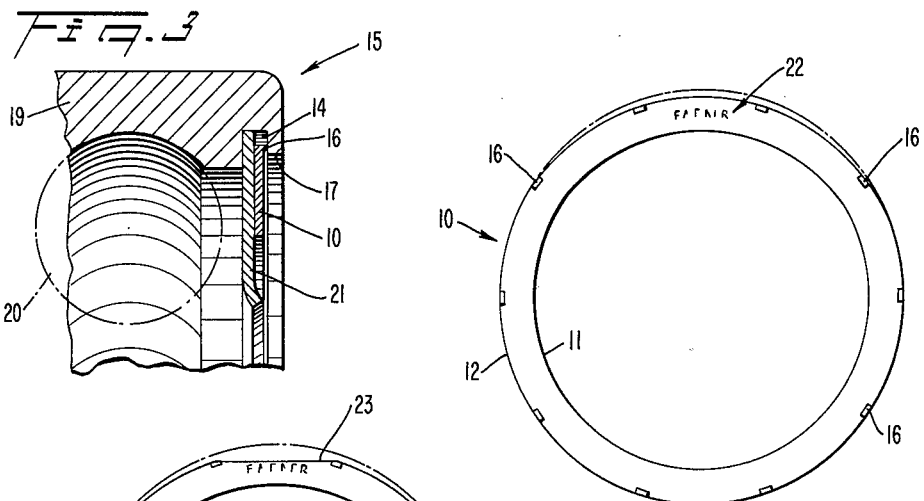
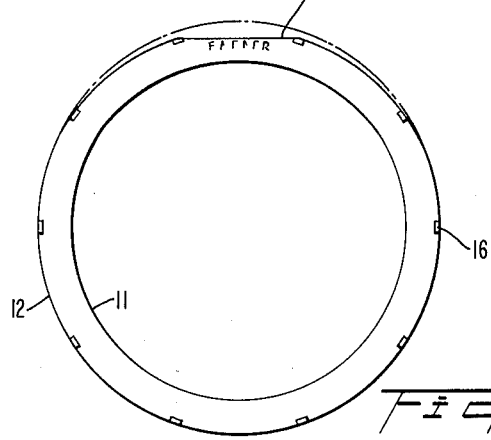
INVENTORS
RALPH S. HOWE, Jr.
JAMES R. BECHERT
BY
Roy C. Hopgood
ATTORNEY

United States Patent Office 3,085,810
Patented Apr. 16, 1963

3,085,810
RETAINING RING FOR A BEARING SEAL
Ralph S. Howe, Jr., New Britain, and James R. Bechert, Bristol, Conn., assignors to The Fafnir Bearing Company, New Britain, Conn., a corporation of Connecticut
Filed Aug. 30, 1960, Ser. No. 52,910
8 Claims. (Cl. 277—181)

This invention, generally, relates to sealed bearings and, more particularly, to a seal cap for a bearing.

In the past, seals and seal assemblies have been held in place in bearings by a split washer which is snapped into an annular groove, the split permitting the washers to be contracted for insertion into the groove. While split washers have been satisfactory to retain bearing seals and seal assemblies in the past, it has been found that under extraordinary impact loading, the split washer may spring out of its groove leaving the sealing element exposed. Further, the split in the washer provides a space through which, under extreme conditions, foreign matter may enter to become packed and, eventually, to wedge the split washer from its groove.

Accordingly, it is an object of this invention to provide a seal cap which will infallibly eliminate the above discussed extreme occurrences.

Another object of the invention is to provide a seal cap arrangement which resists impact loading and the entrance of foreign matter into the bearing seal.

Still another object of the invention is to provide a new and improved structural arrangement for a cap to retain bearing seals and seal assemblies and to a method of assembly of the cap in a bearing.

Briefly, the invention provides a cap for a bearing seal to fit peripherally within a continuous groove at the end of a bearing, the cap being formed of a relatively thin continuous ring of resilient material. The ring has a predetermined radial dimension that is substantially constant over at least 180° of the ring, and the radial dimension of the ring is reduced at one location by a predetermined amount. A method of assembly of the cap in accordance with the invention includes the steps of placing a predetermined edge of the cap into a bearing seal groove first, the predetermined edge being at a point around the periphery of the cap which is substantially diametrically opposite the cap from the reduced radial dimension. Then, the edges of the cap in both directions from the point inserted first are pushed into the groove until only a hump remains, the hump being at the reduced radial dimension. Finally, the humped portion of the cap is snapped into the groove to complete the assembly, as will be explained in greater detail presently.

For a more complete understanding of these and other objects of the present invention, reference may be had to the description which follows and to the accompanying drawing, in which:

FIG. 1 is a diagrammatic illustration of a cap showing the contours of the inner and outer edges, in accordance with the invention;

FIG. 2 is a view in cross-section showing a sealed bearing including a cap in accordance with the invention;

FIG. 3 is an enlarged partial view of one end of the bearing shown in FIG. 2;

FIG. 4 is a view of a seal cap in accordance with a preferred form of the invention; and FIG. 5 is a view showing a modification in accordance with the invention.

Referring now to a preferred form of the invention as shown particularly in FIGS. 1 and 4 of the drawing, the numeral 10 identifies a seal cap having an inner edge 11 and an outer edge 12. The inner edge 11 is concentrically formed about the center A. The outer edge 12, however, is formed of two arcs, $c$—$c'$—$c''$ and $c''$—$c'''$—$c$. The dotted line 13 indicates a continuation of the outer arcuate edge $c$—$c'$—$c''$ about the center A.

The arc $c$—$c'''$ is formed about a center B and is calculated to have a radius which is sufficient to provide the distance $d$ which is just less than the depth of a groove 14 (FIG. 3) in a bearing 15.

It should be noted that the cap 10 is formed continuously around its entire circumference, i.e., without any split or breaks therein. Further, the cap 10 is relatively thin and is formed of a flexible or elastic material.

A plurality of nibs or burrs 16 is formed to extend in one direction from the outer edge 12 at spaced apart intervals around the cap 10, as seen in FIGS. 3 and 4. While these nibs or burrs 16 are not essential to the preferred form of the invention, they are desirable in that they provide added security or safety since they tend to grip the wall of the groove 14 to retain the cap in place even under impact loads. Although any desired number of the burrs 16 may be provided, approximately 10 of these burrs 16 are shown spaced around the outer edge 12 of the cap 10 in the drawing.

As stated previously, the seal cap of the invention is intended to either replace a conventional split washer or, at least, to cover such a split washer to provide a continuous cap surface over a bearing seal. The plurality of burrs 16 not only provides security and safety under impact loads, but provide a small space between the outer surface of the cap 10 and the side of the groove 14 for receiving a suitable tool to permit removal of the cap 10 more easily.

To assemble a seal cap in accordance with the invention, the edge of the cap at the point $c'$ is inserted first into the bearing seal groove 14 as far as it will go. The cap 10 then is forced in as far as possible around its periphery until only a small hump remains out of the seal groove 14. The hump will be located at the thinnest radial dimension, point $c'''$ and the position of least interference with the edge 17 of the groove 14. Finally, the hump is pushed into the seal groove 14 either by hand, with a suitable tool, or by means of a mechanical or hydraulic press, and it should be noted that the cap 10, after assembly, returns to its initial planar shape without perceptive deformation.

With the seal cap 10 in place in a bearing, it will appear as seen in the FIGS. 2 and 3 which show a bearing 15 with an inner race 18 and an outer race 19 with the usual anti-friction elements 20. A seal ring 21 is placed in position with one edge in the groove 14 as is customary, and then the continuous seal cap 10 is inserted as described above.

Since the outer diameter 12 extends for more than 180°, the cap cannot slide or "shuck" back and forth but is securely held in position once the cap is mounted in its groove.

In assembly or removal of a seal cap in accordance with the invention, it is helpful to know at what point around the outer edge 12 of the cap 10 the point $c'''$ is located when the cap 10 is in place within the groove 14. In this connection, a suitable marking 22 such as a word, trademark or the like, is imprinted as illustrated in FIG. 4.

As stated previously, the outer edge 12 of the cap 10 is defined by two circular arcs of different diameters and centers, the ends of the two arcs intersecting. The center A is known since it is the center of the inner edge 11, and therefore, the radius $b$ is known as well as the angle $e$ between the radius $b$ and a horizontal axis. It is desired, therefore, to determine the distance $m$ between the known center A and the unknown center B and to determine the radius $a$ between the center B and the point $c$ on the outer edge 12 at termination of the arc $c''$—$c'$—$c$.

To determine the unknown dimensions, the angle $f$ is equal to 90° plus the value of the angle $e$. Realizing that the cosine of the angle $f$ is equal to minus the sine of the angle $e$, the distance $m$ is determined by the following relationship:

$$m = \frac{2bd - d^2}{2b(1 - \sin e) - 2d}$$

where $d$ is a dimension just short of the depth of the groove 14.

The above relationship is derived from the law of cosines, which is:

$$a^2 = b^2 + c^2 - 2bc \cos f$$

where $c$ in the above equation is the dimension $m$ in FIG. 1.

Having the value of the distance $m$ so that the center B is known, the radius $a$ is determined by the following relationship:

$$a = b + m - d$$

Thus, it is shown arithmetically how to calculate the dimensions of the outer edge 12 for forming a seal cap 10 in accordance with the invention.

In some instances a small part of the outer edge 12 near the point $c'''$ may be permitted outside of the groove 14, which means that the dimension $d$ is just greater than the depth of the groove 14. In those instances, the seal cap 10 may be made easier to install and to remove by providing a substantially straight, chord-like edge 23 as seen in FIG. 5. Of course, this is not a preferred form of the invention, but it is a form which may be permissable under certain circumstances and, in any event, is still an improvement over the split washer.

The following claims are intended to define the valid scope of this invention over the prior art and to cover all changes and modifications falling within the true spirit and scope of the invention.

What is claimed is:

1. In combination, an outer bearing ring having at one end a circumferentially continuous radially inwardly facing groove having a given radial depth defined by an outer lip, a seal member seated against the inner wall of the groove, and a resilient circumferentially continuous retaining ring seated in the groove between said lip and said seal member, said retaining ring being flat and having an outer edge that is circumferentially continuous over an arc exceeding 180° and of a first radius to seat in and be located by the bottom of the groove, said outer edge over an arc greater than 90° being of larger radius than said first radius, the arcs defined by said radii being continuously connected, the difference between said radii being no greater than substantially said radial depth, said retaining ring having a circular inner edge concentric with the arc of said first radius.

2. The combination of claim 1, in which said outer edge includes a plurality of burrs spaced apart about the outermost peripheral edge of the ring.

3. A seal cap to fit peripherally within a continuous groove at an end of a bearing, comprising a relatively thin continuous ring of resilient material and having inner and outer edges, one of said edges having a predetermined radial dimension that is substantially constant over an arc of more than 180° of the ring, the radial dimension of the ring at one location being less than said predetermined dimension by a predetermined amount, and the radial dimension that is less than the substantially constant radial dimension being extended over less than substantially 180°, the other of said edges being concentric with the arc of more than 180°.

4. A seal cap as set forth in claim 3, wherein at least a portion of the outermost edge of the ring in the vicinity of the less radial dimension being formed by a substantially straight, chord-like line.

5. A seal cap to fit peripherally within a continuous groove of given radius and radial depth at an end of a bearing, comprising a relatively thin continuous ring of resilient material, the innermost edge of the ring having a substantially constant radius, the outermost edge of the ring having a radius to seat in and be located by said given radius of the groove, said outer-edge radius being substantially constant over more than 180° about the same center as the innermost edge so that the radial dimension of the ring is substantially constant over more than 180°, and the radial dimension of the ring being less at one location than said substantially constant dimension by a predetermined amount which is at least no greater than the depth of the groove.

6. A seal cap to fit peripherally within a continuous groove of given radius and radial depth at one end of a bearing, comprising a relatively thin ring of resilient material, the ring being continuous around its entire circumference and having inner and outer edges, one of which is circular, the ring having a first radial width dimension, said first dimension being substantially constant over substantially 240° about the same center as said circular edge, the ring having a second and narrower radial width dimension over the remaining substantially 120°, the maximum difference between said radial width dimensions being no greater than substantially the radial depth of the groove and the outer edge radius having a seating fit with the bottom of the groove.

7. A seal cap to fit peripherally within a continuous groove of given radius and depth at one end of a bearing, comprising a relatively thin ring of resilient material, the ring being continuous around its entire circumference, the innermost edge of the ring having a substantially constant radius about a first center, the outermost edge of the ring having a first radius to seat in and be located by said radius of the groove, said outer-edge radius being substantially constant over substantially 240° about said first center to provide a first substantially constant radial dimension of said ring, and the outermost edge of the ring having a second and larger radius substantially constant over substantially 120° about a second center offset from said first center, the parts of said outer edge defined by said first and second radii being contiguous and connected to each other, whereby the radial width dimension along the 120° portion is less than the radial width along the 240° portion.

8. A seal cap as set forth in claim 7, wherein at least a portion of said outermost edge is substantially straight intermediate portions of the edge having said second radius.

References Cited in the file of this patent

UNITED STATES PATENTS

| | | |
|---|---|---|
| 1,251,767 | Gold | Jan. 1, 1918 |
| 1,803,966 | Gibbons | May 5, 1931 |
| 2,089,963 | Johnson | Aug. 17, 1937 |
| 2,277,979 | Horger | Mar. 31, 1942 |
| 3,007,753 | Potter | Nov. 7, 1961 |